Patented Sept. 3, 1940

2,213,390

UNITED STATES PATENT OFFICE 2,213,390

WELDING ELECTRODE

Raymond J. Franklin, North Bergen, N. J., assignor to Chicago Hardware Foundry Company, North Chicago, Ill., a corporation of Illinois No Drawing. Application March 27, 1939, Serial No. 264,488

6 Claims. (Cl. 219—8)

My invention relates to an electrode for use in metallic arc welding, and relates particularly to a coated electrode for welding cast iron.

It is an object of my invention to supply a coated cast iron electrode for deposition by electric arc welding.

It is a further object of my invention to provide an electrode that is suitable for the production of cast iron welds which are equally as machinable as unwelded gray cast iron without the necessity of preheating the base metal, as heretofore practiced.

There are many industrial operations where it is desirable to weld gray cast iron with an electrode having a similar composition. In many of these operations it is necessary to machine the weld deposit. Furthermore, it is known that the deposition of cast iron weld metal by means of the electric arc offers many important physical and mechanical advantages over the deposition of cast iron weld metal by means of the oxyacetylene torch.

However, it has been found that when any of the previously known electrodes of cast iron or other materials are deposited by an electric arc on gray cast iron, that the physical structure of the weld is not entirely gray cast iron, and is not machinable, unless the base metal has been heated to approximately 1,000° F., just prior to welding. It will be apparent that such preheating of cast iron articles involves considerable expense and frequently serious mechanical or physical difficulties.

The major objective requiring the preheating of gray cast iron to approximately 1,000° F., before welding is to prevent rapid cooling, or chilling of the weld area. It is an established metallurgical fact that the more slowly a given iron is cooled through the graphitization range, the more complete the graphitization will be. Therefore, it has been generally accepted that the presence of appreciable quantities of cementite in welds, made with heretofore known electrodes, on cast iron which had not been preheated to a high temperature was mainly due to a chilling action and consequent inhibition of graphitization. It is also known that when gray cast iron is welded by an electric arc, there is frequently more or less loss of carbon and silicon during the operation. Consequently, the chemical composition of the weld may be changed, and, in many cases, this would result in the retention of an appreciable percentage of iron carbide in the weld area. In any case, it is well known that none of the electrodes heretofore proposed for the welding of gray cast iron will produce a weld which is equally as machinable as the base iron unless the latter has been preheated to about 1,000° F.

I have discovered that I can produce unusually high grade cast iron welds by means of the electric arc process with an electrode comprising a metallic core of iron containing an appreciable amount of graphite, and an adherent coating thereon containing two types of components, one type containing appreciable percentages of silicon and carbon, and the other type consisting of nonmetallic slag forming material.

I have found through extensive investigation that when cast iron welds are formed by the deposition of the electrode disclosed herein, that both the weld metal and metal in the zone adjacent thereto, consist entirely of gray cast iron that is wholly free from areas or segregations of cementite which render machining difficult or impossible. I have further found that such machinable welds are produced without the preheating heretofore required. The base cast iron can be heated to some 300° F., to prevent cooling strains, etc., but such preheating is not required for the production of machinable welds.

The electrode of the present invention comprises essentially a metallic core, or support member consisting predominantly of iron containing graphitic carbon and an adherent coating composed substantially of:

|  | Per cent |
|---|---|
| Carbon | 10 to 40 |
| Silicon | 10 to 50 |
| Slag forming material | 10 to 60 |

It will be understood that the respective percentages refer to what may be termed the dry or solid ingredients of the coating. It will be further understood that a binder is necessary to bond the components of the coating and to render it adherent to the metallic core. Various agglutinating materials can be used for a binder, such, for example, as sodium silicate, glue, water soluble resin, etc. It will also be understood that the coating can be applied to the surface of the metallic core by any of the well known methods, such as dipping or extrusion.

In manufacturing my electrode, I generally prefer to use gray cast iron as material for the metallic core. I have found however that I can obtain entirely satisfactory results by using as the support member or core, any material predominantly iron containing more than 1.85% carbon. I have also found that the ferrous core material may contain alloy elements such, for example, as nickel or molybdenum. As an illustration, I have used iron having the following range of analysis:

| | Per cent |
|---|---|
| Carbon | 3.25 to 3.50 |
| Silicon | 2.75 to 3.00 |
| Manganese | 0.05 to 0.07 |
| Phosphorus | 0.05 to 0.75 |
| Sulphur | 0.08 max. |

In compounding the coating, I usually prefer to employ graphite to supply the carbon required. I have found that natural graphites containing various amounts of impurities are entirely satisfactory. The carbon can also be supplied by other forms of carbonaceous materials.

The silicon component of the coating should be in a metallic condition and in such form that it will be readily reactive during the welding operation. I have found that the silicon can be supplied in the form of metallic silicon, ferro-silicon or various other metallic compounds containing some 25% or more silicon. I usually prefer to employ ferro-silicon containing approximately 50% Si, as I have found that this material gives highly satisfactory results and is generally more economical than other materials.

The slag-forming constituent of the coating is largely melted by the heat of the arc during welding, forming a residual slag which covers the solidified and solidifying metal. Therefore, I prefer to use as slag material an oxygen containing compound of one or more metals which will form a slag having suitable physical characteristics for the welding operation.

I have found that oxygen containing compounds selected from metal of the group, calcium, aluminum, magnesium and barium are particularly suitable for use as the principal slag forming component of my electrode. As an illustration, I can use calcium carbonate in the form of marble flour; aluminum silicates such as feldspar or kaolin; magnesium carbonate or magnesium silicate, and barium carbonate. It will be understood that there are numerous other slag forming ingredients which are equally suitable.

I have noted that some of the metallic silicon is oxidized during welding, and the resultant silica combines with the original slag forming component.

When it is desirable to have a slag which is more fluid than that produced by the essential components of the coating, I have found I can add a minor amount of another slag forming ingredient for the purpose of increasing the fluidity. Thus, I can add a minor amount of a second slag forming ingredient up to approximately 20% of the total weight of the coating without in any way adversely affecting the valuable properties and characteristics of my electrode. I have found that fluorides of sodium, calcium or lithium are suitable for such additions. For example, I can add up to 20% of fluorspar to the coating for the purpose of increasing fluidity. It should be understood however that such secondary material is a minor slag forming ingredient and that the percentage included should always be less than the percentage of the major essential slag forming ingredient present.

The following are examples of some of the coatings which I have found to be satisfactory in the manufacture of the electrode of the present invention:

| | Per cent |
|---|---|
| 1. Powdered marble | 25 |
| Ferro silicon (50% Si) | 60 |
| Graphite | 15 |
| 2. Powdered marble | 26 |
| Fluorspar | 14 |
| Ferro silicon (50% Si) | 30 |
| Graphite | 30 |
| 3. Barium carbonate | 26 |
| Fluorspar | 14 |
| Ferro silicon (50% Si) | 30 |
| Graphite | 30 |
| 4. Feldspar | 25 |
| Lithium fluoride | 5 |
| Ferro silicon (50% Si) | 50 |
| Graphite | 20 |

I have found that welds made with my present electrode on gray cast iron which has not been preheated are entirely free from cementite or other hard and nonmachinable carbide segregations. It will be understood that when the electrode is to be used for the welding of relatively heavy sections of gray cast iron, that it is sometimes desirable to preheat the base metal to approximately 300° F., in order to eliminate the possibility of strains through the formation of a sharp temperature gradient. In such cases however, the base metal should not be heated to a temperature higher than approximately 300°.

In all cases welds formed by the application of the electrode of the present invention consist of gray cast iron entirely free from segregations of cementite, and the weld deposit is characterized by a much finer grain structure than that normally found in gray cast iron. The fusion line between the base metal and weld metal is clearly defined, and entirely free from a zone or layer of cementite. The hardness of the base metal and the weld metal are substantially the same. Numerous observations indicate that in general the actual weld metal is some 15 to 35 Brinell numbers harder than the base metal. This is apparently due entirely to the finer grain structure. The maximum hardness at the fusion line is never greater than the maximum hardness throughout the weld area.

The material advantages of the results which are produced with the electrode of the present invention will be apparent from the foregoing.

I claim:

1. A welding electrode comprising a core predominantly of iron containing more than 1.85% of carbon including graphitic carbon and a coating thereon, said coating comprising substantially carbon 10% to 40%, silicon 10% to 50%, slag-forming material consisting principally of an oxygen-containing compound of metal 10% to 60%, and a binder; said electrode being characterized by the property of producing, when melted in an electric arc, welds of gray cast iron which are substantially free from cementite and which are readily machinable.

2. A welding electrode comprising a core predominantly of iron containing graphitic carbon and a coating thereon, said coating comprising substantially carbon 10% to 40%, silicon 10% to 50%, an oxygen-containing compound of metal selected from the group calcium, aluminum, magnesium and barium 10% to 60%, fluoride of metal selected from the group sodium, calcium and lithium 1% to 20%, and a binder.

3. A welding electrode comprising a core predominantly of iron containing graphitic carbon and a coating thereon, said coating comprising substantially carbon 10% to 40%, silicon 10% to 50%, calcium carbonate 10% to 60%, and a binder.

4. A welding electrode comprising a core predominantly of iron containing graphitic carbon and a coating thereon, said coating comprising substantially carbon 10% to 40%, silicon 10% to 50%, feldspar 10% to 60%, and a binder.

5. A welding electrode comprising a core predominantly of iron containing graphitic carbon and a coating thereon, said coating comprising substantially carbon 10% to 40%, silicon 10% to 50%, feldspar 10% to 60%, fluoride of metal selected from the group sodium, calcium and lithium 1% to 20%, and a binder.

6. A welding electrode comprising a cast iron core containing more than 1.85% but not over 3.5% carbon and having a coating thereon, said coating containing about two parts of silicon to one part of carbon, and slag forming material capable under the conditions obtaining in electric arc welding of aiding in the introduction of silicon and carbon into the metal of the weld to produce a weld of gray cast iron.

RAYMOND J. FRANKLIN.